(12) United States Patent
Kim et al.

(10) Patent No.: US 11,824,573 B1
(45) Date of Patent: Nov. 21, 2023

(54) BEAMFORMING MRC PRE-PROCESSING SYSTEM FOR ADJACENCY REMOVAL OF HDR RADIO

(71) Applicant: RF2Digital Inc., Yongin-si (KR)

(72) Inventors: Seong Jun Kim, Seoul (KR); Sung Hyun Yoon, Gwangju-si (KR); Chul Yong Uhm, Suwon-si (KR); Tae Hoon Kim, Yongin-si (KR); Hyun Chul Shin, Seongnam-si (KR); Jong Il Park, Seoul (KR)

(73) Assignee: RF2Digital Inc., Yongin-si (KR)

( * ) Notice: Subject to any disclaimer, the term of this patent is extended or adjusted under 35 U.S.C. 154(b) by 0 days.

(21) Appl. No.: 18/313,827

(22) Filed: May 8, 2023

(30) Foreign Application Priority Data

Sep. 13, 2022 (KR) .......................... 10-2022-0115175

(51) Int. Cl.
*H04B 1/12* (2006.01)
*H04H 40/18* (2008.01)

(52) U.S. Cl.
CPC ............. *H04B 1/123* (2013.01); *H04H 40/18* (2013.01)

(58) Field of Classification Search
CPC ................................ H04B 1/123; H04H 40/18
See application file for complete search history.

(56) References Cited

U.S. PATENT DOCUMENTS

| 2019/0214036 A1* | 7/2019 | Wurtz | G10L 21/0208 |
| 2021/0193104 A1* | 6/2021 | Nørholm | G10L 25/78 |
| 2021/0329368 A1* | 10/2021 | Stafford | H02J 7/00712 |

FOREIGN PATENT DOCUMENTS

| KR | 10-2002-0068341 A | 8/2002 |
| KR | 10-1735837 B1 | 5/2017 |
| KR | 10-2019-0106078 A | 9/2019 |

OTHER PUBLICATIONS

"Written Decision on Registration" Office Action issued in KR 10-2022-0115175; mailed by the Korean Intellectual Property Office dated Dec. 15, 2022.

* cited by examiner

*Primary Examiner* — Dac V Ha
(74) *Attorney, Agent, or Firm* — Studebaker & Brackett PC (57) ABSTRACT

A beamforming maximum ratio combining (MRC) pre-processing system for adjacency removal of HDR includes a first filter module implemented in a digital radio receiver and allowing only a low side band signal having a frequency lower than a center frequency of a radio signal in a selected channel to pass therethrough and a processor module performing beamforming on the selected channel based on a difference in gain value between the signal that has passed through the filter module and an original signal that has not passed through the filter module.

1 Claim, 10 Drawing Sheets

BEAMFORMING EFFECT OF INCREASING ORIGINAL SIGNAL BY REMOVING ADJACENCY OF PORTION INCLUDING UDS

BEAMFORMING EFFECT OF INCREASING ORIGINAL SIGNAL BY REMOVING ADJACENCY OF PORTION INCLUDING LDS

BEAMFORMING MRC PRE-PROCESSING SYSTEM FOR ADJACENCY REMOVAL OF HDR RADIO

CROSS-REFERENCE TO RELATED APPLICATIONS

This application claims benefit of priority to Korean Patent Application No. 10-2022-0115175 filed Sep. 13, 2022, the entire contents of which are incorporated herein by reference.

BACKGROUND

1. Field

The present disclosure relates to a beamforming maximum ratio combining (MRC) pre-processing system for adjacency removal of high definition radio (HDR), and more particularly, to a beamforming MRC pre-processing system for adjacency removal of HDR capable of forming RF beamforming by using a AGC gain difference by applying a filter to a sideband of a channel selected in a digital radio reception process.

2. Description of Related Art

HDR is a digital radio system manufactured under license from iBiquity Digital Corporation of the United States.

Figure 1:
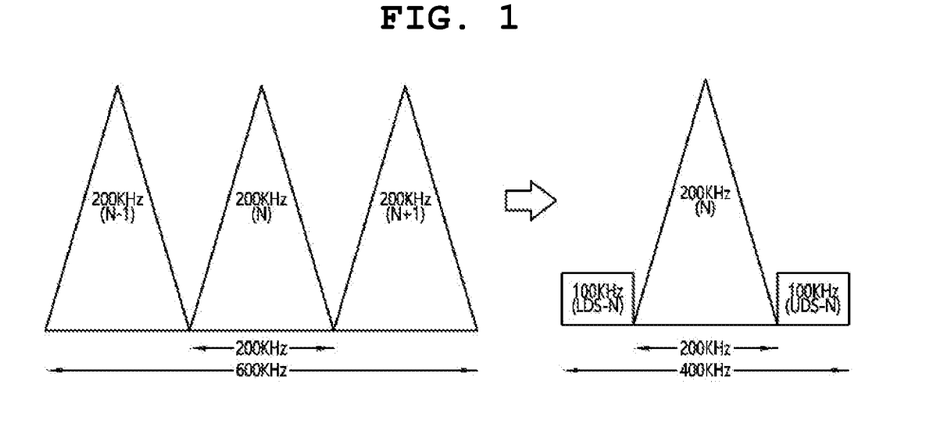

As shown in FIG. 1, FM broadcasting in the United States transmits radio signals in units of 200 KHz, and HDR uses a method of mixing existing FM (N) with digital (N) and transmitting the same.

In other words, HDR includes the same digital radio signal on both sidebands of an analog FM signal and transmits the same and is designed such that lower digital sideband (LDS) and upper digital sideband (UDS) are symmetrical and listening is possible even if only one LDS or UDS is perfectly restored.

Figure 2A:
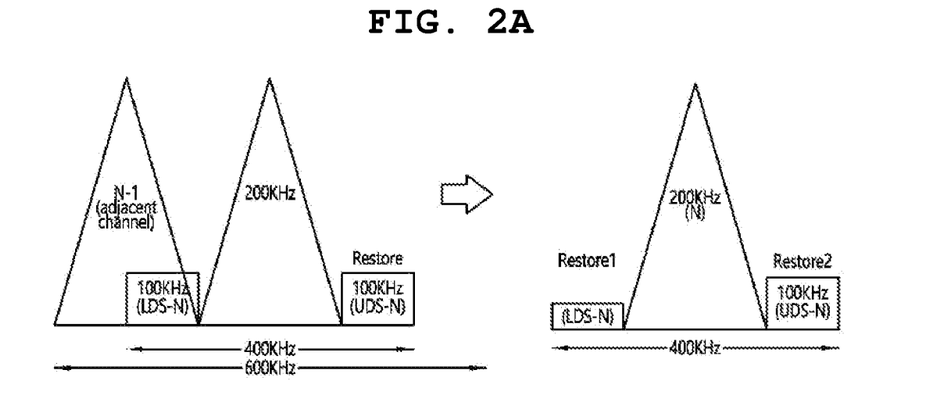

In the United States, frequencies are managed not to be affected by both sides of the HDR digital signal, and thus, adjacency generally occurs only in one sideband as shown in FIG. 2A, and in this case, the signal is restored using the other sideband signal not affected by adjacency. However, when a received signal of an adjacent channel is much larger than a received signal of the original channel, the signal may be out of the range of a signal that can be expressed digitally, and thus, it is impossible to restore the signal.

Figure 2B:
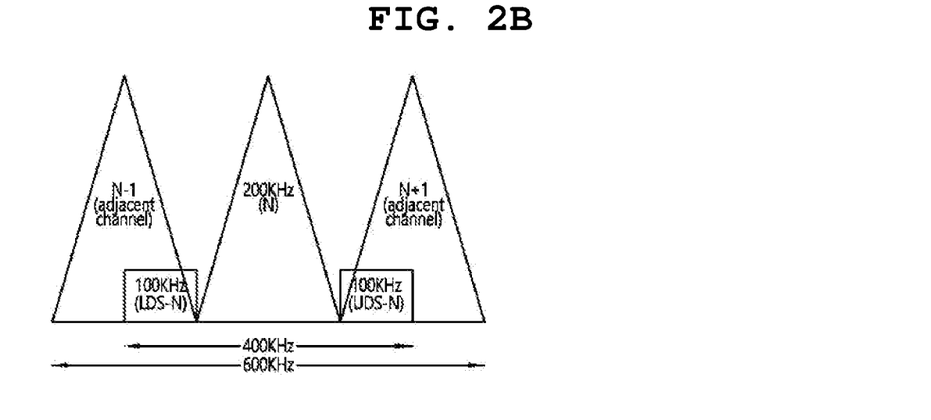

In addition, when crossing a border or region, in some cases, as shown in FIG. 2B, both LDS and UDS are degraded by adjacent channels. In this case, there is a problem that it is difficult to restore due to a low SNR of a digital stage in the adjacent channel, as well as degradation due to mobility performance.

Meanwhile, the background art described above is technical information that the inventor possessed for derivation of the present disclosure or acquired in the process of derivation of the present disclosure, and cannot be considered as known art disclosed to the general public prior to filing the present disclosure.

RELATED ART DOCUMENT

Patent Document (Patent Document 1) Korean Patent Registration No. 10-1735837

SUMMARY

An aspect of the present disclosure may provide a beamforming maximum ratio combining (MRC) pre-processing system for adjacency removal of HDR capable of forming RF beamforming by using a AGC gain difference by applying a filter to a sideband of a channel selected in a digital radio reception process.

The technical problem of the present disclosure is not limited to the technical problem mentioned above, and other technical problems not mentioned will be clearly understood by those skilled in the art from the following description.

According to an aspect of the present disclosure, a beamforming maximum ratio combining (MRC) pre-processing system for adjacency removal of HDR includes: a first filter module implemented in a digital radio receiver and allowing only a low side band signal having a frequency lower than a center frequency of a radio signal in a selected channel to pass therethrough; and a processor module performing beamforming on the selected channel based on a difference in gain value between the signal that has passed through the filter module and an original signal that has not passed through the filter module.

The beamforming MRC pre-processing system for adjacency removal of HDR may further include: a second filter module allowing only an upper side band signal having a frequency higher than the center frequency of the radio signal in the selected channel to pass therethrough.

The beamforming MRC pre-processing system for adjacency removal of HDR may further include: a noise removal module tracking and removing noise included in an audio signal received from an antenna, wherein the noise removal module includes: a noise detector performing fast Fourier transform (FFT) on the audio signal into a frequency domain and detecting noise from the FFT-ed signal; and a feedforward active noise removal (ANC) unit removing the noise detected by the noise detector, performing inverse FFT (IFFT) on the noise-removed audio signal into a time domain, and storing the IFFT-ed signal in a memory.

According to another aspect of the present disclosure, a beamforming MRC pre-processing system for adjacency removal of HDR includes: a filter module implemented in a digital radio receiver and allowing a low side band signal having a frequency lower than a center frequency of a radio signal in a selected channel and a low side band signal having a frequency lower than a center frequency to pass therethrough; and a processor module performing beamforming on the selected channel based on a difference in gain value between the signal that has passed through the filter module and an original signal that has not passed through the filter module.

According to one aspect of the present disclosure described above, RF beamforming may be formed using an AGC gain difference by applying a filter to a sideband of a channel selected in a digital radio reception process.

In addition, an MRC gain may be maximized by increasing RF beamforming and processing using an AGC gain difference by applying a filter to all sidebands of HDR digital or applying a filter to HDR digital and adjacent signals.

BRIEF DESCRIPTION OF DRAWINGS

The above and other aspects, features and other advantages of the present disclosure will be more clearly understood from the following detailed description taken in conjunction with the accompanying drawings.

FIGS. 1 to 2B are diagrams illustrating high definition radio (HDR) characteristics according to the related art.

FIGS. 4A to 9 are diagrams illustrating a specific example in which a signal is restored by a processor module.

DETAILED DESCRIPTION

In the following detailed description, reference is made to the accompanying drawings that show, by way of illustration, particular embodiments in which the invention may be practiced. These embodiments are described in sufficient detail to enable those skilled in the art to practice the invention. It is to be understood that the various embodiments of the invention, although different, are not necessarily mutually exclusive. For example, a certain feature, structure, or characteristic described herein in connection with an embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present disclosure is defined only by the appended claims, appropriately interpreting, along with the full range of equivalents to which the claims are entitled. In the drawings, like numerals refer to the same or similar functionality throughout the several views.

Hereinafter, embodiments of the present disclosure will be described in more detail with reference to the drawings.

Figure 3:
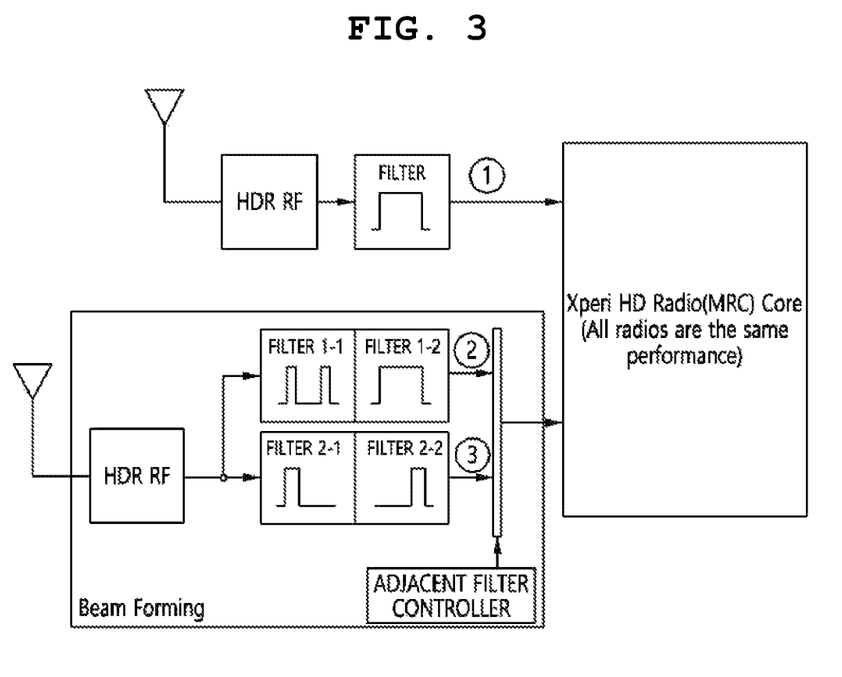
FIG. 3 is a diagram illustrating a schematic configuration of a beamforming maximum ratio combining (MRC) pre-processing system for adjacency removal of HDR according to an embodiment of the present disclosure.

FIG. 3 is a diagram illustrating a schematic configuration of a beamforming maximum ratio combining (MRC) pre-processing system for adjacency removal of HDR according to an embodiment of the present disclosure.

The beamforming MRC pre-processing system for adjacency removal of HDR according to the present disclosure is to form RF beamforming using an AGC gain difference by applying a filter to a sideband of a channel selected in the digital radio reception process, and may be implemented in a vehicle radio reception device.

Specifically, the beamforming MRC pre-processing system for adjacency removal of HDR according to an embodiment of the present disclosure includes a first filter module (corresponding to any one of filter 1-1, filter 1-2, filter 2-1, and filter 2-2 of FIG. 3) allowing only a low side band signal having a frequency lower than a center frequency of a radio signal in a selected channel to pass therethrough; and a processor module performing beamforming on the selected channel based on a difference in gain value between the signal that has passed through the filter module and an original signal that has not passed through the filter module.

That is, the beamforming MRC pre-processing system for adjacency removal of HDR according to the present disclosure may increase an MRC SNR through an additional path that forms beamforming through pre-filter manipulation in the case of MRC without changing an existing path.

As shown, the first filter module is a filter circuit allowing only frequencies of a specific band, and a selective signal may be extracted through the first filter module.

Figure 4A:
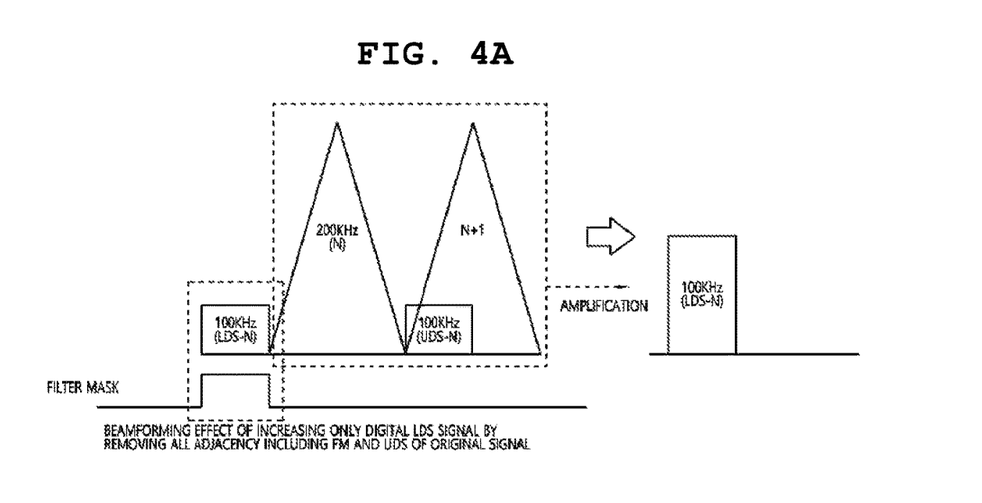

For example, when the first filter module has the characteristics of filter 2-1 shown in FIG. 3, the entire energy as much as FM and N+1 adjacent signal of the original signal may be transferred to the LDS to amplify a signal, as shown in FIG. 4A.

Figure 4B:
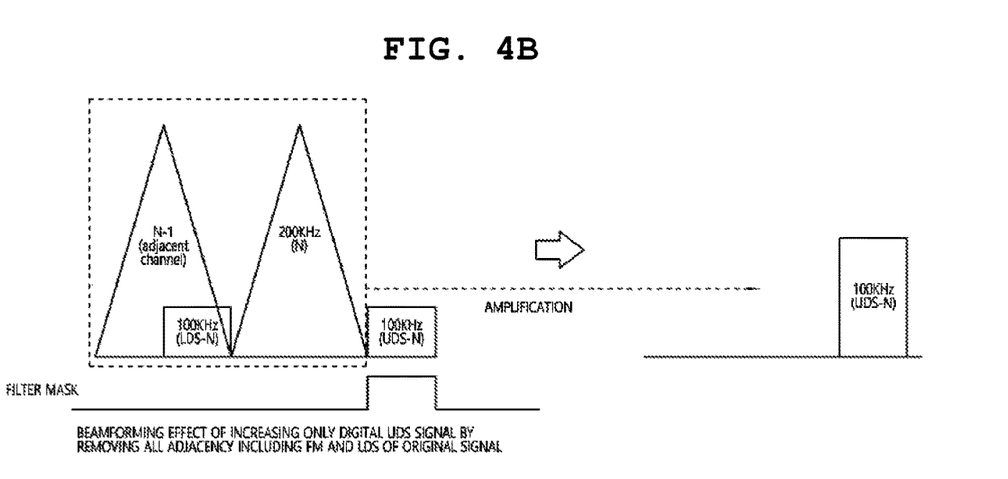

In addition, when the first filter module has the characteristics of filter 2-2 shown in FIG. 3, the entire energy as much as FM and N−1 adjacent signal of the original signal may be transferred to the UDS to amplify a signal, as shown in FIG. 4B.

Figure 5:
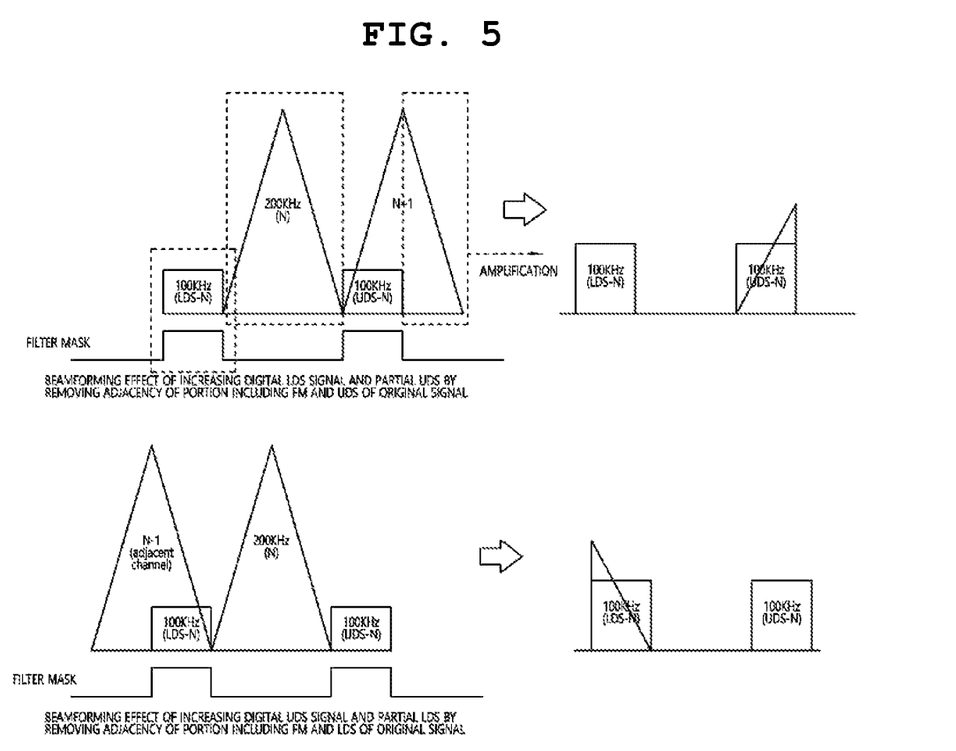
Figure 6:
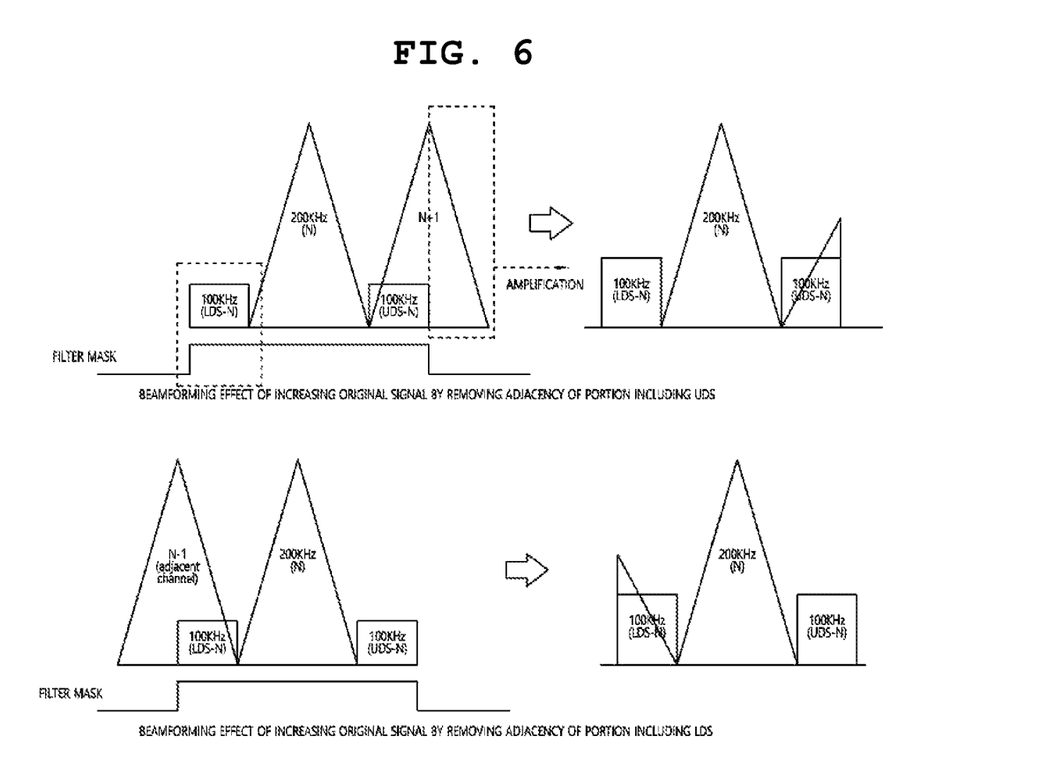

In addition, when the first filter module has the characteristics of filter 1-1 shown in FIG. 3, partial energy as much as FM and (N+1/N−1 adjacency) of the original signal may be divided to be transferred to the LDS and the UDS as shown in FIG. 5.

In addition, when the first filter module has the characteristics of the filter 1-2 shown in FIG. 3, partial energy as much as FM and (N+1/N−1 adjacency) of the original signal may be transferred to the original signal.

The processor module performs beamforming and restores a signal using the AGC gain difference.

In an embodiment, the processor module processes a signal using an MRC algorithm. The MRC algorithm is a technique that weights a good part of a channel when the maximum amount is created according to phase adjustment, and since signal processing using such an MRC technique is already widely known, a detailed description thereof will be omitted.

In an embodiment, the processor module may recover the LDS from the LDS and LDS adjacent signals.

In an embodiment, the processor module may recover the UDS from the UDS and UDS adjacent signals.

FIGS. 4A and 4B are diagrams illustrating a specific example of beamforming and signal restoration using an AGC gain difference in a processor module.

Figure 7:
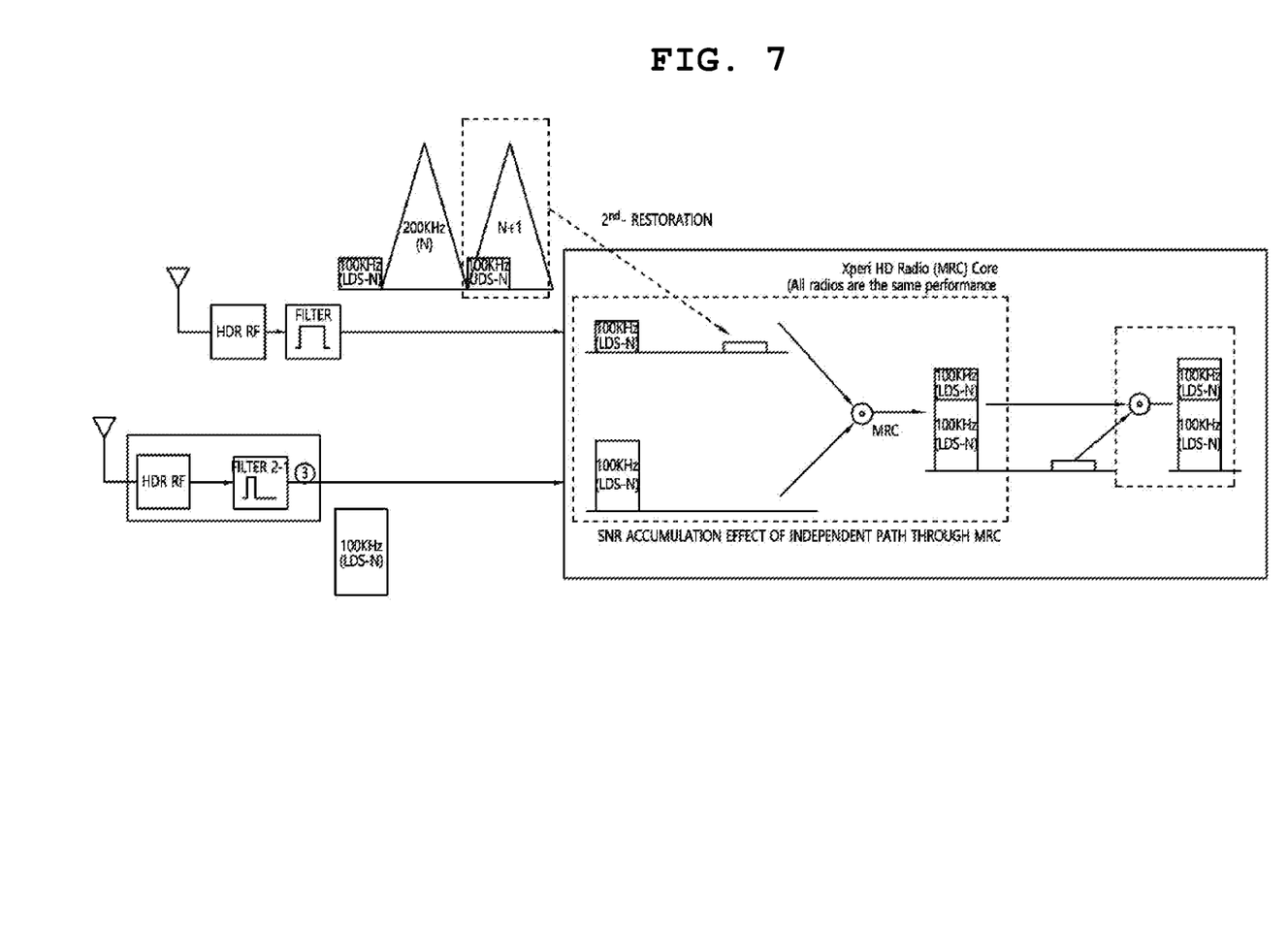
Figure 8:
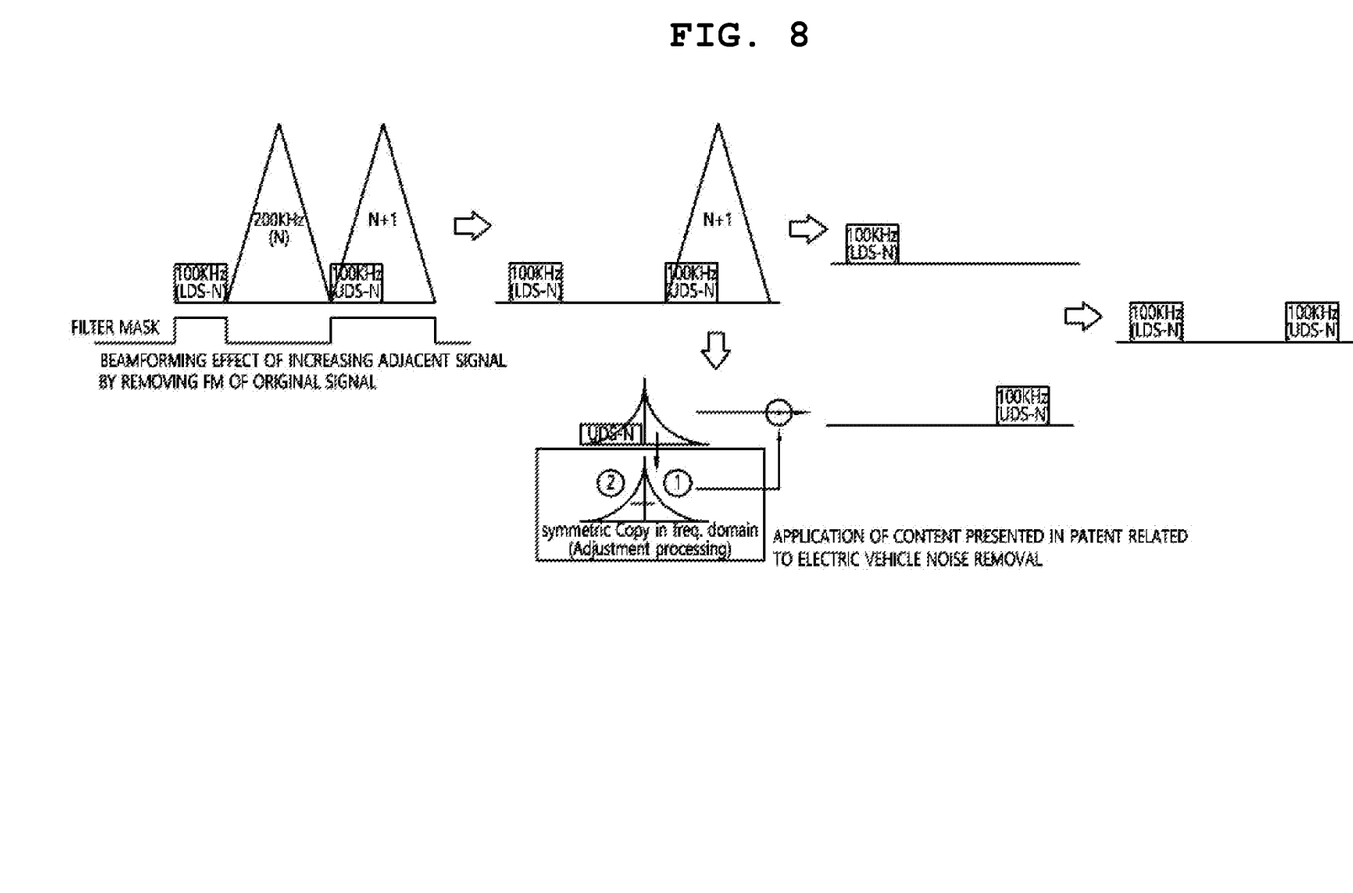
Figure 9:
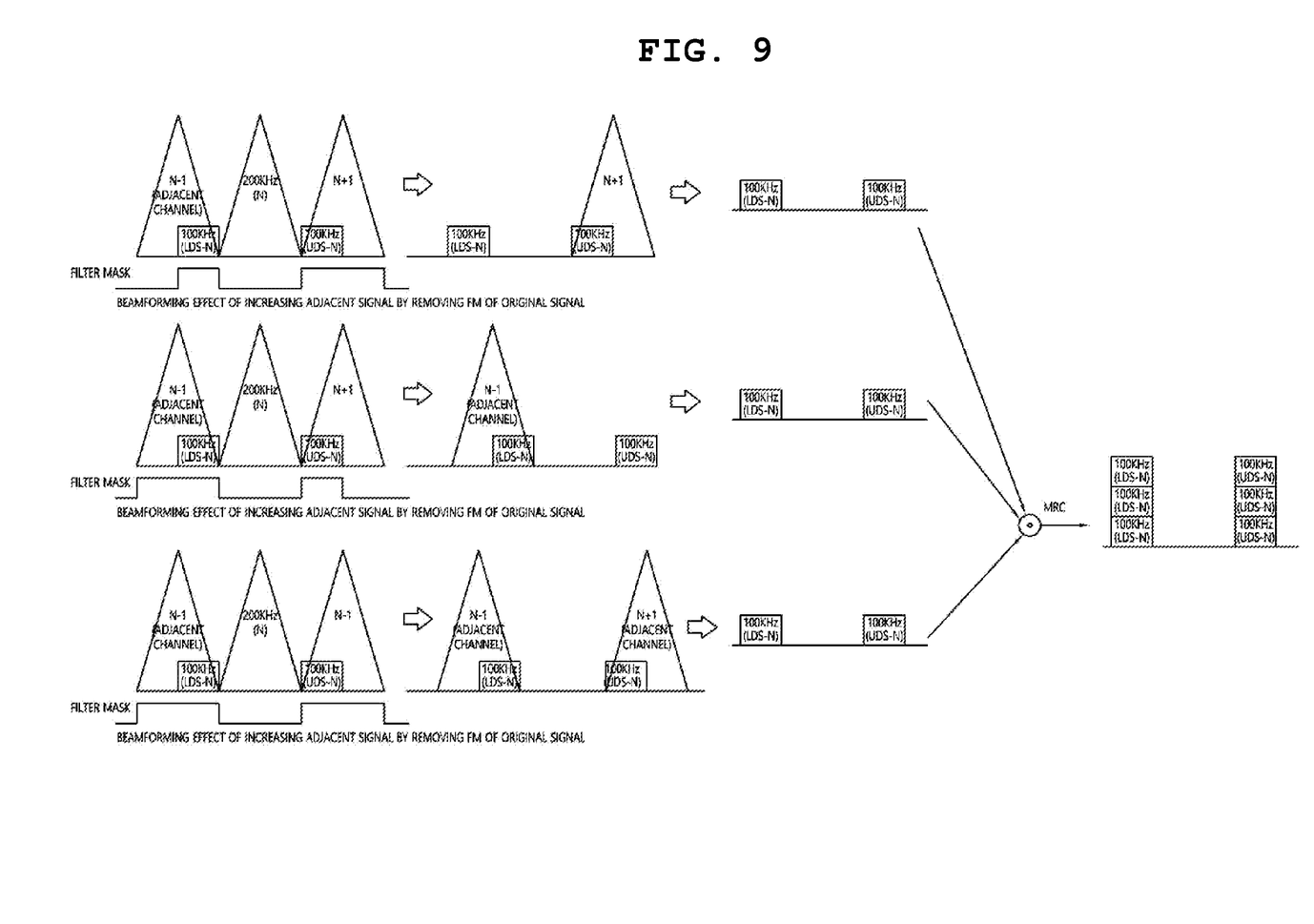

For example, assuming that the first filter module has the characteristics of filter 2-1 among the various filters shown in FIG. 3, the portion shown in the green regions of FIG. 7 is an embodiment of beamforming and signal restoration according to the MRC algorithm, the portion shown in the purple region of FIG. 7 is an embodiment of restoring the LDS from the LDS and LDS adjacent signals, and the portion shown in the red regions of FIG. 7 is an embodiment of restoring the UDS from the UDS and UDS adjacent signals.

In some other embodiments, the beamforming MRC pre-processing system for adjacency removal of HDR according to the present disclosure may further include a noise removal module that tracks and removes noise included in a radio signal.

The noise removal module according to the present disclosure uses multi-stage hybrid active noise removal (ANC) technology using a memory, and FFT (Fast Fourier Transform) and IFFT (Inverse Fast Fourier Transform) structures may be used in HybridANC configuration by using the memory. Accordingly, noise that changes from moment to moment may be tracked and removed.

Figure 11:
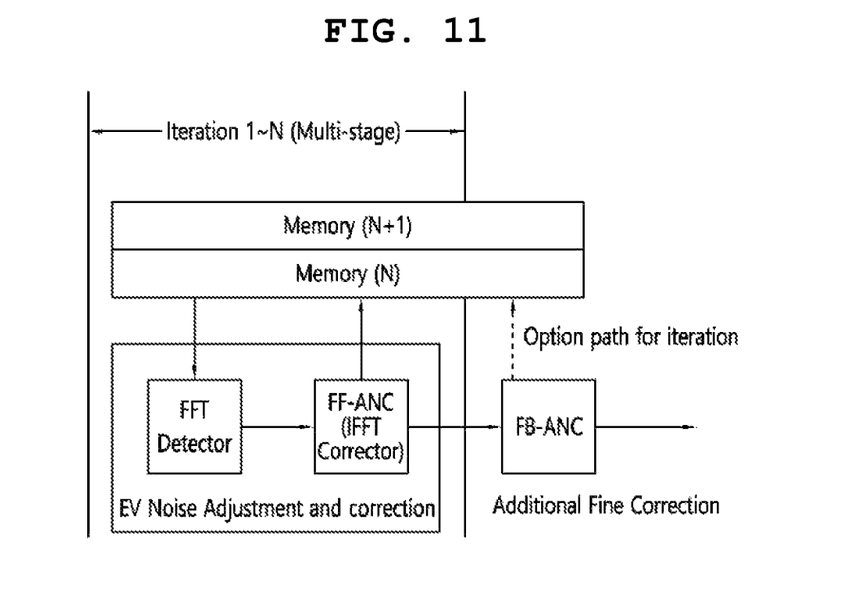
FIG. 11 is a diagram illustrating a specific configuration of a noise removal module.

FIG. 11 is a diagram illustrating a specific configuration of the noise removal module 100.

As shown, the noise removal module includes a noise detector (corresponding to an FFT detector in FIG. 11) performing FFT on an audio signal into a frequency domain and detecting noise from the FFT-ed signal and a feedforward ANC unit (corresponding to an FFANC in FIG. 11) removing noise detected by the noise detector, performing IFFT on the noise-removed audio signal into a time domain, and storing an IFFT-ed signal in a memory.

In addition, as will be described below, fine noise remaining in the noise-removed audio signal may be more precisely removed through a feedback ANC unit (corresponding to an FB-ANC in FIGS. 2A and 2B) selectively applied to the present disclosure.

FIG. 11 is a diagram illustrating a specific example in which noise is removed using a memory-based hybrid-ANC noise removal system for removing early audio and wideband noise according to an embodiment of the present disclosure.

The memory-based hybrid-ANC noise removal system for removing early audio and wideband noise according to an embodiment of the present disclosure may be a probeless antenna EV noise removal solution.

First, an audio signal received through an RF receiver (antenna) of a vehicle is stored in a memory, and at the same time, the received audio signal is transmitted to the noise detector.

The noise detector converts a time domain of the audio signal into a frequency domain through FFT, and extracts a noise component from the audio signal converted into the frequency domain. Since various techniques for extracting noise from FFE-ed signals are already widely known, detailed description thereof will be omitted.

Thereafter, the feedforward ANC unit calculates the noise signal detected by the noise detector and the audio signal before the noise is removed to extract a noise-removed audio signal, performs IFFT on the noise-removed audio signal into the time domain, and stores the IFFT-ed signal in the memory.

At this time, the memory-based hybrid-ANC noise removal system for removing early audio and wideband noise according to an embodiment of the present disclosure iteratively performs the signal processing process on the audio signal (the audio signal from which noise was primarily removed) updated in the memory to enhance efficiency of noise removal.

That is, as shown, when an audio signal N1 from which noise has been removed through the primary signal processing process is stored in the memory, the noise detector and the feedforward ANC unit recall the audio signal N1 stored in the memory, iteratively perform the process described above, and additionally store an audio signal N2f, from which noise has been secondarily removed, in the memory. At this time, an optional path shown in the drawing is a noise component of a past symbol in the frequency domain, and the past information extends to N-1, N-2, N-3, etc., and includes all processing using the same.

In this manner, hidden EV noise may be effectively removed by using the symmetric noise of the audio signal, and the primary and secondary signal processing processes described above may be combined into one and expandable (skip the memory update process).

Figure 10:
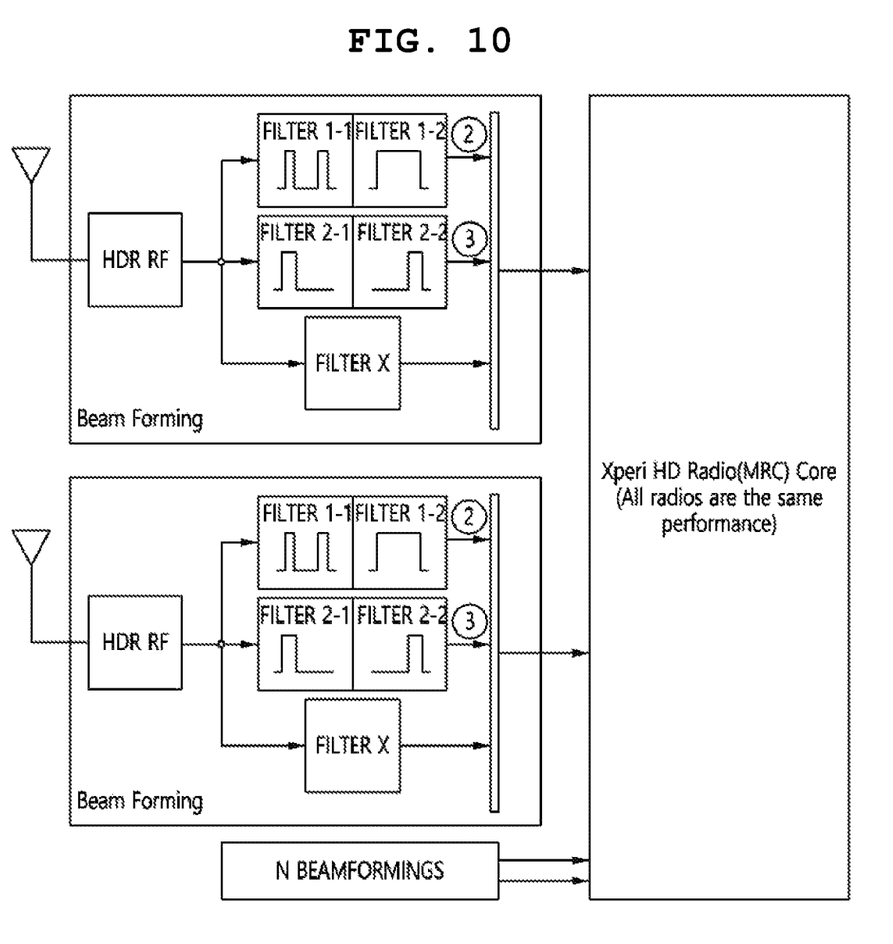
FIG. 10 is a diagram illustrating a beamforming MRC pre-processing system for adjacency removal of HDR according to another embodiment of the present disclosure.

FIG. 10 is a diagram illustrating a schematic configuration of a memory-based hybrid-ANC noise removal system for removing early audio and wideband noise according to another embodiment of the present disclosure.

The memory-based hybrid-ANC noise removal system for removing early audio and wideband noise according to another embodiment of the present disclosure further includes a feedback ANC unit in the noise removal system according to an embodiment of the present disclosure.

The feedback ANC unit corrects the audio signal from which noise has been removed by the feedforward ANC unit based on the audio signal from which noise has been removed by the feedforward ANC unit and the past audio signal stored in the memory before receiving the audio signal.

The memory-based hybrid-ANC noise removal system for removing early audio and wideband noise according to another embodiment of the present disclosure additionally includes two tuners to add a noise probing path as an antenna probing EV noise removal solution.

EV Noise in frequency domain is possible even without the existing noise detector (the same function as N−1 Information [option path] in a probeless antenna solution, and the only difference is N-th Information in the case of antenna probing. Here, the information also extends to N−1, N2, N−3, etc. and includes all processing using the same).

Figure 12:
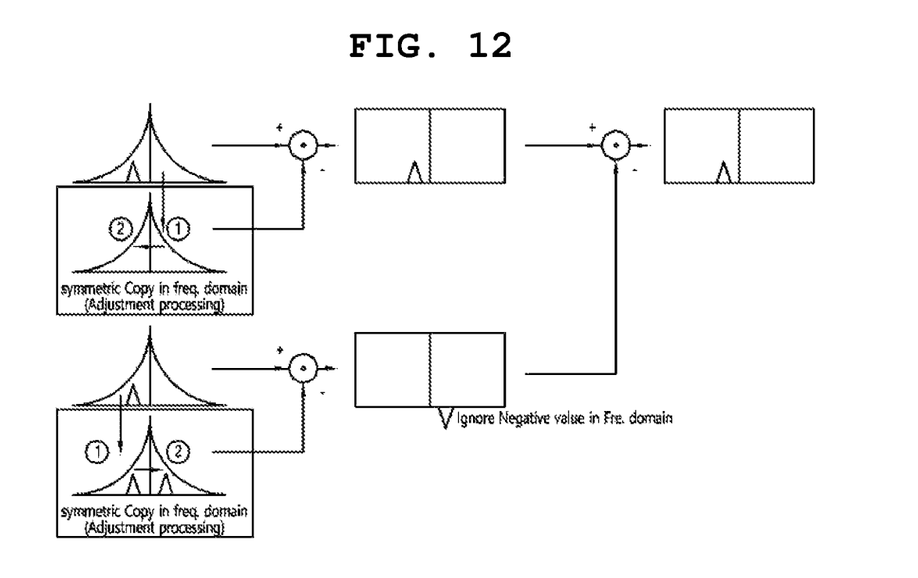
FIG. 12 is a diagram illustrating an example in which noise is extracted according to embodiments of the present disclosure.

FIG. 12 is a diagram illustrating an example in which noise is extracted according to embodiments of the present disclosure. In the case of a symmetrically restored signal, whether a signal has noise may be additionally determined using FM phase properties.

As such, the present disclosure is not limited to FB-ANC and may be configured only with FF-ANC, and as a technology that may additionally use FB-ANC, noise removal based on artificial intelligence (AI) is possible.

In an embodiment, the feedforward ANC unit may estimate noise using AI.

Specifically, the feedforward ANC unit extracts feature points from each of an n-th audio signal, and subsequent audio signals (n+1, n+2, and n+3) stored in a memory after the n-th audio signal.

The feedforward ANC unit generates coordinate information for positions of the extracted feature points formed in the frequency domain, and inputs the coordinate information for each of the generated feature points as an input value to an artificial neural network trained in advance. Here, the artificial neural network is a deep neural network including an input layer, a hidden layer, and an output layer.

The feedforward ANC unit estimates a noise signal included in an audio signal input during next signal processing based on an output value of the artificial neural network.

In an embodiment, the feedforward ANC unit predicts an appearance position of the next coordinate information through the artificial neural network based on a movement pattern of the coordinate information for the feature points input to the artificial neural network, and extracts a noise signal having a frequency feature corresponding to the predicted appearance position from the audio signal.

The feedforward ANC unit calculates similarity between the noise signal predicted by the artificial neural network and the noise signal actually detected by the noise detector, and adjusts weights between nodes constituting the artificial neural network based on the calculated similarity.

For example, the feedforward ANC unit calculates similarity between a signal pattern of the noise signal predicted by the artificial neural network and a signal pattern of the noise signal actually detected by the noise detector, and when the calculated similarity is less than a preset reference similarity, the feedforward ANC unit adjusts the weights between the nodes constituting the artificial neural network until the calculated similarity reaches the reference similarity or greater.

Accordingly, noise included in the audio signal may be predicted using the artificial neural network, and noise removal performance may be improved by additionally removing noise not detected by the noise detector.

Such technology according to the present disclosure may be implemented as an application or implemented in the form of program instructions that may be executed through various computer components and recorded on a computer-readable recording medium. The computer-readable recording medium may include program instructions, data files, data structures, etc. alone or in combination.

The program instructions recorded on the computer readable medium may be designed and configured specifically for the present disclosure or may be publicly known and available to those who are skilled in the field of computer software.

Examples of the computer-readable medium include magnetic media such as hard disks, floppy disks and magnetic tapes, optical recording media such as CDROM and DVD, and magneto-optical media such as floppy disks, and hardware devices specially configured to store and execute program instructions, such as ROM, RAM, flash memory, and the like.

Examples of the program instructions may include not only machine language such as those created by a compiler but also a high-level language that may be executed by a computer using an interpreter or the like. Such hardware devices may be configured to operate as one or more software modules to perform the operations of the present disclosure, and vice versa.

Although the embodiments of the present disclosure have been described hereinabove, those skilled in the art will appreciate that various changes and modifications may be made to the embodiments described herein by the addition, modification, removal and the like of elements without departing from the scope and spirit of the present disclosure as disclosed in the appended claims, and the various changes and modifications are to be construed as being included within the right scope of the present disclosure.

What is claimed is:

1. A beamforming maximum ratio combining (MRC) pre-processing system for adjacency removal of high definition radio (HDR), the beamforming MRC pre-processing system comprising:
   a first filter module implemented in a digital radio receiver and allowing only a low side band signal having a frequency lower than a center frequency of a radio signal in a selected channel to pass therethrough;
   a second filter module allowing only an upper side band signal higher than the center frequency of the radio signal in the selected channel to pass therethrough;
   a processor module performing beamforming on the selected channel based on a difference in gain value between the signal that has passed through the first filter module and the second filter module and an original signal that has not passed through the filter module; and
   a noise removal module tracking and removing noise included in an audio signal received from an antenna,
   wherein the noise removal module includes:
   a noise detector performing fast Fourier transform (FFT) on the audio signal into a frequency domain and detecting noise from the FFT-ed signal; and
   a feedforward active noise removal (ANC) unit removing the noise detected by the noise detector, performing inverse FFT (IFFT) on the noise-removed audio signal into a time domain, and storing the IFFT-ed signal in a memory.

* * * * *